Jan. 15, 1963 D. O. GALLENTINE ET AL 3,074,067
STYLUS ASSEMBLY
Original Filed Sept. 6, 1955 2 Sheets-Sheet 1

INVENTORS
DONAL O. GALLENTINE
& CHARLES E. SMITH

BY Hurwitz and Rose

ATTORNEYS

Jan. 15, 1963   D. O. GALLENTINE ET AL   3,074,067
STYLUS ASSEMBLY
Original Filed Sept. 6, 1955   2 Sheets-Sheet 2
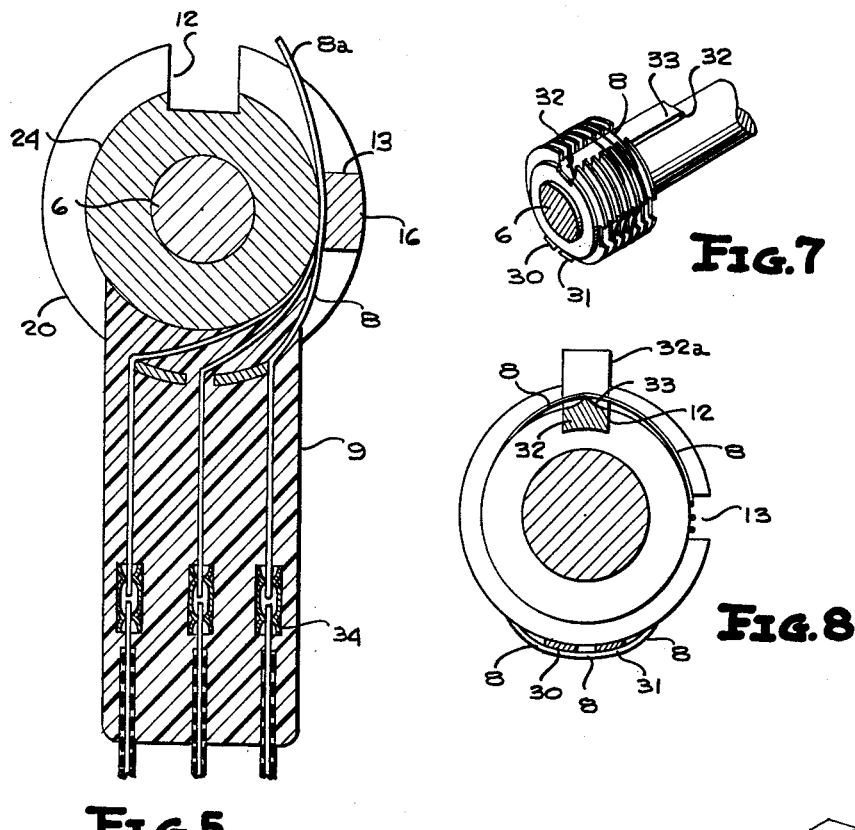
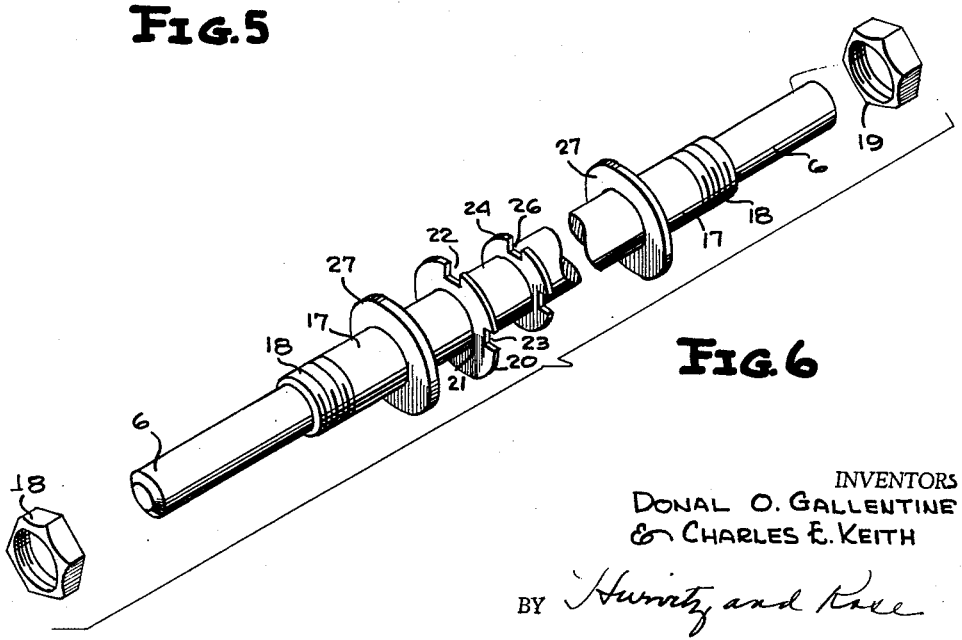
INVENTORS
DONAL O. GALLENTINE
& CHARLES E. KEITH
BY *Hurwitz and Rose*
ATTORNEYS though the support, wherein the support has a plurality of longitudinally spaced transverse grooves in which the stylus wires are positioned, the material between the grooves imparting a high degree of lateral stability to the styli.

United States Patent Office 3,074,067
Patented Jan. 15, 1963

3,074,067
STYLUS ASSEMBLY
Donal O. Gallentine, Eau Gallie, and Charles E. Keith, Melbourne, Fla., assignors to Radiation, Inc., Melbourne, Fla., a corporation of Florida
Original application Sept. 6, 1955, Ser. No. 532,454, now Patent No. 2,966,726, dated Jan. 3, 1961. Divided and this application Apr. 14, 1960, Ser. No. 36,103
10 Claims. (Cl. 346—139)

This application is a division of S.N. 532,454 filed September 6, 1955, now Patent No. 2,966,726, granted January 3, 1961.

The present invention relates generally to recording styli, and more particularly to a multiple recording stylus assembly, having a large number of closely spaced styli adapted for recording on an electro-responsive recording medium.

An electro-responsive recording medium, such as suitably treated paper, is discolorable in response to the passage of electrical current therethrough, the degree of discoloration depending upon the strength of the electric current. Electric current may be applied to the recording paper by conductive styli which engage the surface of the paper. Discoloration of the paper is a local effect, that is, it occurs only in a small area adjacent the point of contact of a stylus. It is, therefore, possible to space closely a plurality of styli to provide a large number of adjacent indications in a relatively small area without fear that the indications will overlap and therefore become indistinct. Difficulties arise, however, in a multiple stylus assembly capable of recording information in a plurality of closely-spaced channels, particularly when recording on a continuously moving strip of recording paper. More specifically, the styli may be sufficiently displaced either to come into contact with one another, or to produce overlapping indications. The magnitude of this difficulty is underlined by the fact that in a specific application of the present invention the styli are required to be spaced apart by only 0.013 inch.

The recording response of paper employed in the practice of the present invention is dependent on the contact resistance between the styli and the paper. The contact resistance between the paper and any stylus is dependent upon the contact pressure therebetween, and this pressure must therefore be substantially the same for all styli if uniform recording density in different recording channels is desired.

Another problem encountered in providing a suitable stylus assembly is the placement of the wires on the assembly. The magnitude of this problem beomes apparent on consideration of a specific stylus assembly, wherein 213 styli, each having a diameter of 0.005 inch, are assembled on a support having a length of 3.9 inches. Obviously, the individual placement and alignment of the styli in such an arrangment may be a tedious and expensive operation. In addition, the close spacing between the styli wires raises the problem of providing sufficient area of contact between the styli and the stylus support adequately to secure the wires immovably to the support.

It is therefore an object of the present invention to provide an easily fabricated multiple stylus assembly wherein each stylus has a high degree of lateral stability.

Another object of the present invention is to provide a multiple stylus support having an elongated stylus support and a plurality of closely spaced styli arranged along the longitudinal axis of the support, wherein the support has a plurality of longitudinally spaced transverse grooves in which the stylus wires are positioned, the material between the grooves imparting a high degree of lateral stability to the styli.

Another object of the present invention is to provide a method of fabricating a multiple stylus assembly which insures accurate alignment of the ends of the styli.

It is another object of the present invention to provide a method of fabricating a multiple stylus assembly wherein a length of wire is wound about an elongated member to provide a single layer of special turns, each turn is secured to the elongated member along an axially extended surface of the member and all the turns of wire are cut in a single operation at the same point on the circumference of the member.

Yet another object of the present invention is to provide a method of fabricating a multiple stylus assembly wherein a cutter bar having a cutting surface is positioned in a first axially extending groove in a cylindrical stylus support, with the cutting surface of the cutter bar exposed, wherein a length of wire is wound about the support to provide a single layer of spaced turns, each turn bonded to the stylus support at a point having a predetermined spacing from the cutting surface, and wherein the turns of wire are cut by pressing the turns simultaneously against the cutting surface, to provide a plurality of separate styli.

Still another object of the present invention is to provide a method of fabrication of a multiple stylus assembly which is rapid and economical and which insures accurate alignment of the ends of the styli. In accordance with this object of the invention, the styli wires are wound on a cylindrical stylus support having a plurality of spaced circumferential grooves and two axially extending grooves having a predetermined relative spacing. A cutter bar having a cutting surface is placed in one of the axial grooves, with its cutting surface exposed. A first length of wire is wound once about a first circumferential groove and then passed axially through the second axially extending groove to a further circumferential groove, having a predetermined spacing (greater than one groove) from the first groove. The wire is then wound once about the further circumferential groove. This winding procedure is repeated until the length of the stylus support has been covered. The lengths of wire in the second axially extending groove are bonded to the bottom thereof, and the turns of wire are then cut by pressing the turns against the cutting surface of the cutter bar. The inherent resiliency of the wire causes the unbonded portions of the wire to spring outwardly from the stylus support, providing terminals on one side of the second axial groove to which electrical connections may be made. The remaining unbonded portions of the wires recording are the styli. The degree of support provided for each stylus wire is determined by the spacing between the circumferential grooves in which successive turns of wire are wound. By winding the turns in adjacent circumferential grooves a complete set of stylus wires may be formed from a single length of wire.

In a preferred embodiment of the present invention a first length of wire is wound about every third circumferential groove taken in succession, commencing with the first groove of the support, and second and third lengths of wire are then wound in every third groove commencing, respectively, with the second and third circumferential grooves of the support. In consequence lengths of the wire equal to the spacing between three circumferential grooves may be bonded to the stylus support, within the axial groove, providing a strong bond between the individual stylus wires and the stylus support. This insures against the stylus wires becoming detached during extended periods of use of the stylus assembly.

Still other problems arise in the fabrication and utilization of the stylus assembly of the present invention in consequence of the slight spacing between the individual stylus wires. Connection of lead-in wires to the styli becomes tedious, and the prevention of short circuits between the closely spaced connected ends of the styli wires during utilization of the assembly is difficult.

Difficulty of connecting the styli wires to the lead-in wires is reduced by dividing the ends of the stylus wires that are to be connected to lead-in wires into three circumferentially spaced groups of wires. This is accomplished in the preferred form of the present invention by bonding first and second axially-extending, circumferentially spaced strips of insulating material to the stylus assembly after winding each of the first and second lengths of wire, respectively. The strips are placed so that the points at which the ends of the first and second groups of turns of stylus wires emerge from the circumferential grooves, when the wires are cut, are circumferentially spaced from one another, and each is spaced from the point at which the ends of the third group of turns of wire emerges from the grooves. That end of each of the stylus wires which is to be connected to a lead-in wire is now displaced both axially and circumferentially from each adjacent stylus wire, thereby facilitating handling of the wires during connection of the stylus wires to the lead-in wires. The additional spacing provided between the wires also lessens the problem of maintaining the wires separated during utilization of the assembly.

After each of the stylus wires is connected to a lead-in wire, a plastic material is molded about each of the stylus wires, at a point between the connections and the stylus support, and about the stylus support in the region where the stylus wires emerge from the circumferential grooves. The molded body maintains the separation between the stylus wires and the connections of the stylus wires to the lead-in wires, and, in addition, rigidly supports the stylus wires, thereby preventing breakage during shipping and installation of the stylus assembly.

It is, therefore, another object of the present invention to provide a method of fabrication of a multiple stylus support which provides for separation of the lead ends of the stylus wires into separated groups, to facilitate handling of the stylus wires during the process of connection to the external leads, and to minimize the problem of maintaining the wires separated during utilization of the stylus assembly.

Still another object of the present invention is to provide a multiple stylus assembly having a plurality of fine stylus wire, each having an end connected to a different lead-in wire, wherein the points of connection of the stylus wires to the lead-in wires, the portion of the stylus wires located between the connection points and the stylus assembly, and the region of the stylus assembly adjacent the points of connection, are enclosed within a plastic body, to maintain separation between the stylus wires and to support the stylus wires.

The above and still further features, objects, and advantages of the present invention will become apparent upon consideration of the following detailed description of one specific embodiment thereof, especially when taken in conjunction with the accompanying drawings, wherein:

FIGURE 5 is a view similar to FIGURE 4, but illustrating in addition a plastic body for supporting the stylus wires.

FIGURE 6 is a view in perspective, illustrating one method of assembly of a stylus support in accordance with the present invention.

FIGURE 7 is a view in perspective illustrating a method of winding stylus wire; and FIGURE 8 is an end view of the styli support of the invention illustrating a method of cutting the stylus wires.

Figure 1:
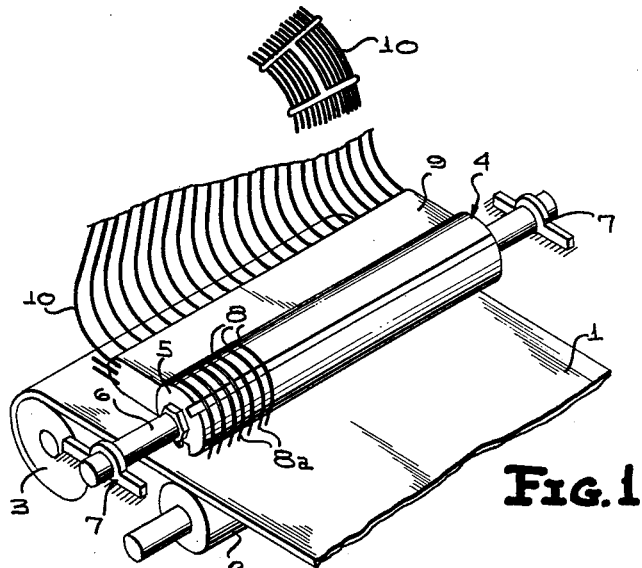
FIGURE 1 illustrates a recording system employing the multiple stylus assembly of the present invention, and wherein the stylus assembly is diagrammatically illustrated.

FIGURE 1 of the accompanying drawings illustrates a recording apparatus employing the stylus assembly of the present invention for recording signals from a plurality of information channels, each in a different longitudinally extending recording channel on a suitable recording paper.

Referring more specifically to the apparatus of FIGURE 1, recording paper 1 is fed at a uniform rate from a supply reel (not shown) over a rotating electrically conductive platen 2, to a take-up reel 3. Supported above the paper 1 and the platen 2 is a stylus assembly 4, including an electrically non-conductive, cylindrical stylus support 5 extending across the width of the paper 1 perpendicular to the direction of movement thereof. The stylus support 5 may be carried on a shaft 6, secured at its ends to stationary supports 7 to fix the position of the stylus assembly above the paper 1.

Each of a plurality of longitudinally-spaced stylus wires 8 is wound about and suitably secured to a portion of the circumference of the stylus support 5, and has one end 8a (see FIGURE 2) extending downwardly into sliding contact with the paper 1 directly above the platen 2. The other end of each of the stylus wires 8 extends outwardly from the stylus support 5 at a suitable location and is connected to a different one of a plurality of lead-in wires 10. The junction of the wires 8 and 10 is enclosed within a plastic insulating body 9 to maintain the wires separated, and further to support the wires, to prevent undue flexing thereof adjacent the stylus support 5, which might otherwise lead to breakage of the wires.

Each of the lead-in wires 10 is connected in the output circuit of a different information channel (not shown) and has applied thereto an electrical current, which varies in amplitude in accordance with the information supplied to the information channel, and which generally is either "on" or "off." If a voltage responsive recording medium 1 is employed, a voltage may be applied between the stylus wires 8 and the platen 2. If, as in the presently described device, a current responsive paper 1, such as Teledeltos paper, is employed, a current is passed through a series circuit comprising a stylus wire 8, the paper 1 and the platen 2. Teledeltos paper is an electrically conductive paper which is discolored by the passage of an electric current therethrough, the degree of discoloration depending upon the magnitude of the current passed. The varying current passed through the series circuit activates the paper 1 adjacent each stylus wire 8 to provide a permanent record of the current applied, each record being contained in a different longitudinally extending channel on the paper 1.

In order to insure faithful reproduction of the information in the various information channels the stylus assembly of the present invention must insure that the ends 8a of the styli wires are accurately aligned, and that the contact pressure between each of the styli wires 8 and the paper 1 is uniform. This is particularly important when recording on Teledeltos paper since the contact resistance between the wires 8 and the paper 1 must be substantially uniform in order for the current flowing through the paper to be an accurate reproduction of the information applied to the leads 10. Further, where it is desirable to record a large number of closely spaced channels on the paper 1, the stylus support 5 must provide a high degree of lateral stability to the styli wires 8 to prevent short circuits therebetween, or an overlapping of the recordings.

Figure 2:
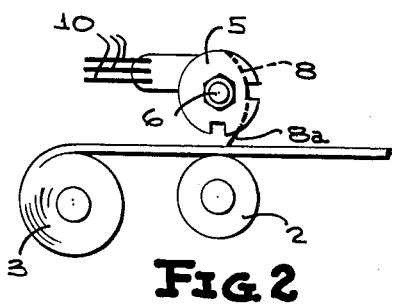
FIGURE 2 is a cross sectional view taken along line 2—2 of FIGURE 1.
Figure 4:
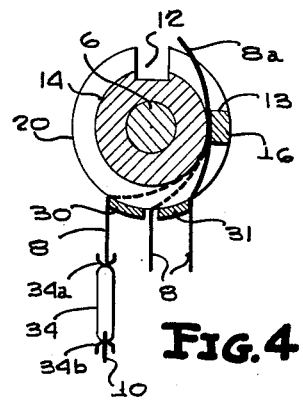
FIGURE 4 is a cross-sectional view taken along line 4—4 of FIGURE 3.
Figure 3:
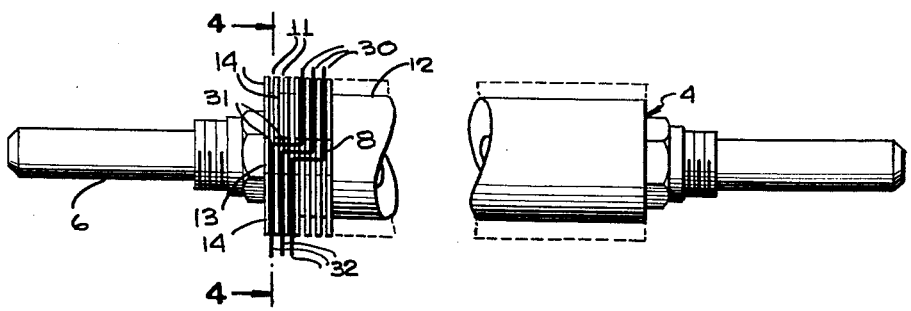
FIGURE 3 is a detail view of the stylus assembly of the present invention.

For a complete description of the structural arrangement of the stylus assembly of the present invention reference is made to FIGURES 3 and 4, the illustrations in FIGURES 1 and 2 being merely diagrammatic.

The stylus support 5 of the stylus assembly 4 is provided with a plurality of axially spaced, circumferential grooves 11, the portions of the stylus support 5 between the circumferential grooves 11 providing a plurality of spaced, circumferential guides 14. The stylus support 5 is further provided with two axially extending grooves 12 and 13 having a predetermined angular or circumferential spacing therebetween. The groove 12 is deeper than the groove 13 and the groove 13 is of the same depth as the circumferential grooves 11. The elements employed in the stylus support structure depend upon the method of fabricating the support 5 and therefore a discussion of this feature follows at this point.

The stylus support 5 may be fabricated as a unitary molded body employing well-known molding techniques, in which event the shaft 6 comprises two separate, axially-aligned extensions of the body, each extending from a different end thereof. Such a method of fabrication lends itself to a large scale production, where the initial cost of setting up the molding apparatus is more than offset by the saving of fabrication time over extended periods of operation, which may be required in other methods. Another method of fabricating the stylus support which lends itself to small scale production is to employ a shaft 6 on which is assembled a plurality of alternately arranged discs 20 and 24, which provide the various grooves 11, 12 and 13.

Referring to FIGURE 6, which illustrates the elements employed in the latter method of fabrication of the stylus support 5, the shaft 6 is provided with an enlarged central portion 17, of a length somewhat greater than the ultimate length of the completed support 5. Each end of the enlarged portion 17 is provided with screw threads 18, and two stop nuts 19 are provided, each for engaging the threads 18 at a different end of the enlarged portion 17. Each disc 20 is a thin circular disc of insulating material having a centrally disposed aperture 21 and two radial notches 22 and 23, the notch 22 being deeper than the notch 23. Each disc 24 comprises a thin circular disc of smaller diameter than the disc 20, having a centrally disposed aperture 25 and a single radial notch 26. The bottom of the notches 22 and 26 are at equal radial distances from the center of their respective discs 20 and 24, and the radial distance of the bottom of the notch 23 from the center of disc 20 is equal to the outer diameter of the disc 24. The diameters of the apertures 21 and 25 are both approximately equal to the outer diameter of the enlarged portion 17 of the shaft 6.

In assembling the stylus support 5 a stop nut 19 is threaded onto the threads 18 on one end of the enlarged portion 17 of the shaft 6 and a washer 27 having a central aperture is slipped over the other end of the shaft 6 and brought into abutting relation with the stop nut 19. A disc 20 is then slipped over the other end of the shaft 6 and is followed alternately by discs 24 and 20 until the desired length of the stylus support 5 is attained. A second washer 27 is then placed on the other end of the shaft 6 and the second stop nut 19 is threaded on the threads 18 at the other end of the shaft 6. The notches 22 and 26 of the discs 20 and 24 are then aligned, thereby also aligning the notches 23 in the discs 20, and the stop nuts 19 tightened to maintain the positioning of the discs 20 and 24. The discs 20 provide the guides 14 and the discs 24 provide the grooves 11 of the stylus support 5, as illustrated in FIGURE 3. The aligned notches 22 and 26 provide the axially extending groove 12 and the aligned notches 23 provide the axially extending groove 13, also illustrated in FIGURE 3.

The stylus support 5, fabricated by either of the methods discussed, or by some other equally suitable method, such as machining with a gauged mill, is wound with a plurality of styli wires 8 (see FIGURE 3) each having an arcuate first portion 27 disposed in a first groove 11, a straight portion 28 arranged in the axial groove 13 and perpendicular to the portion 27 and an arcuate third portion 29 disposed in a second groove 11 perpendicular to the portion 28, the portions 27 and 29 extending in opposite directions from the portion 28. The stylus wire 8 is secured to the stylus support 5 by cementing or bonding the straight portion 28 of the wire 8 to the bottom surface of the groove 13, as illustrated at 16. The spacing between the grooves 11, in which the portions 27 and 29 of a single stylus wire 8 are disposed, is determined by the degree of support desired for the stylus wire 8. The greater the spacing between grooves 11 the longer is the length of the portion of the wire 28 bonded to the support 5, and therefore the greater is the mechanical support for the styli wires 8. As illustrated in FIGURE 3 a spacing of two grooves 11 is employed between the portions 27 and 29 of the styli wires 8, although it is not intended to limit the present invention to this specific spacing since the spacing is determined in part by the mechanical stress to which it is expected the wires 8 are to be subjected. Each of the stylus wires 8 is disposed in a different pair of grooves 11, the straight portions 28 of the wires 8 occupying the same section of the groove 13 being circumferentially displaced in the groove 13 to prevent a short circuit between the various styli wires 8.

The arcuate portions 27 and 29 of the stylus wires 8 have a radius of curvature of the same sense as, but greater than, the radius of curvature of the stylus support 5. The length and radius of curvature of the portions 27 are such that at least a half of each portion 27 is positioned between its associated guides 14, thereby providing a high degree of lateral stability to the portions 27, which is essential when a large number of closely spaced channels are to be recorded on the paper 1. In addition, the guides 14 prevent fouling of the stylus wires 8 during assembly of the stylus assembly 4, as will become apparent during the subsequent description of the method of assembly.

The length and radius of curvature of the portions 29 of the stylus wires 8 are such that a relatively long length of wire 8 extends outwardly from the stylus support 5, to facilitate connection of the stylus wires 8 to the lead-in wires 10. The portions 29 of the wires 8 are divided into three groups of wires to further facilitate connecting the wires 8 to the lead-in wires 10. Separation of the wires 8 into three groups is accomplished by bonding two axially-extending insulating strips 30 and 31 to the circumferential surfaces of the guides 14. The strips 30 and 31 have a predetermined arcuate spacing therebetween, the portions 29 of the wires 8 positioned in the first, fourth, seventh, etc. grooves 11 being disposed on one side of the strip 30, the portions 29 of the wires 8 positioned in the third, sixth, ninth, etc. grooves being disposed on one side of the strip 31 and the portions 29 of the wires 8 positioned in the second, fifth, eighth, etc. grooves 11 being disposed between the other sides of the strips 30 and 31.

It is conceivable that the various stylus wires 8 could be individually pre-formed and mounted on the stylus support 5. Such a method of assembly would obviously be quite tedious and time consuming and would introduce further complication in attempting accurately to align the ends 8a of portions 27 of the wires 8 so that all of the ends 8a contact the paper 1 with equal pressure.

The present invention provides a method of manufacturing the stylus wires 8 which is economical and rapid, and which automatically insures accurate alignment of the ends 8a of the wires 8. In accordance with the present method of manufacture, illustrated in FIGURE 7 of the accompanying drawings, a cutter bar 32, having lateral and transverse dimensions approximately equal to the corresponding dimensions of the groove 12, and having a cutting surface 33, is disposed in the groove 12 with the cutting surface 33 facing outwardly therefrom. The height of the cutter bar 32 is such that the cutting surface 33 is above the periphery of the bottom surface of the circumferential grooves 11, but below the periphery of the circumferential surfaces of the guides 14. One end of a first length of suitable stylus wire. such as tungsten wire, is disposed in the first groove 11 and connected to the side of one of the guides 14, being radially positioned adjacent the bottom of the groove 11 and circumferentially positioned in the shorter arcuate section between the grooves 12 and 13. The wire 8 is wound clockwise, as seen in FIGURE 7, in the groove 11, passing over the cutting surface 33 of the cutter bar 32 and at the end of the turn entering the groove 13. The wire is then bent approximately perpendicular to the turn in the groove 11, and extended through the groove 13 to the intersection of the groove 13 and the fourth groove 11. The wire 8 is bent aprpoximately perpendicular to the portion 28 of the wire in the groove 13 and wound clockwise in the fourth groove 11. This winding procedure is continued until every third groove, 11, starting with the first, has been provided with a turn of wire. Thereafter, the other end of the wire 8 is cemented to the third from last guide 14. The sections 28 of the wire 8 are then cemented to the bottom surface of the groove 13 and the insulating strip 30 is secured to the guides 14 at between 90° and 180° clockwise of the groove 12. A flat metal bar 32a, see FIGURE 8, is made to bear on the portion of the stylus wires contacting the cutting surface 33 of the cutter bar 32 with sufficient force to shear the wires 8. The free end of each turn of wire 8 springs outwardly, due to its inherent resilience, thereby providing the previously described portions 27 and 29 of the wires 8. The outward swing of the portion 29 of each of the wires 8 is limited by the strip 30, thereby positively determining the point at which the portions 29 emerge from between the guides 14.

A second length of wire is then wound on the stylus support 5, starting with the second groove 11, in the same manner as the first wire. The portions 28 of the second length of wire are cemented to the bottom surface of the groove 13, and the insulating strip 31 is secured to the guides 14 clockwise of the portions 29 of the first group of stylus wires 8. The wires are cut, and the outward swing of the portions 29 of the stylus wires 8 is then limited by the strip 31, thereby maintaining the portions 29 of the first and second groups of stylus wire 8 separated. A third length of wire is then wound on the stylus support 5 starting with the third groove 11, after which the groove 13 is filled with a bonding material. The wires are cut, and the outward swing of the portions 29 is determined by the natural resilience of the wire. Although, as described, each length of wire is cut before the next length is wound thereby requiring three separate cutting operations, it is apparent that all three lengths of wire could be wound and then all the wires cut simultaneously.

Since the length of each of the portions 27 of the wires 8 is determined by the arcuate distance between the groove 13 and the cutting surface 33 of the cutter bar 32 the length of all of the portions 27 is the same and the length of all may be controlled by varying the angle between the grooves 12 and 13. A 90° angle between the grooves 12 and 13 is illustrated in FIGURE 4 although other angles may be employed within the scope of the present invention.

After all of the wires 8 have been cut, the portions 27 are removed from the first three grooves 11, since there is no portion 29 attached to them. The portions 29 which are positioned in the first three grooves 11 are connected, respectively, to the portions 27 in the fourth, fifth and sixth grooves 11. Similarly, the portions 29 of the stylus wire 8 positioned in the last three grooves 11 are removed since the portions 27 therein are connected, respectively, to the portions 29 positioned in the preceding three grooves 11.

Referring to FIGURE 4 of the accompanying drawings, the portion 29 of each of the stylus wires 8 is connected by means of a short copper tube 34 or a tube of other suitable conductive material, to a different lead-in wire 10. One end of each copper tube 34 is slipped over the end of a portion 29 of the wire 8 and crimped into engagement therewith, as shown at 34a. The end of a lead-in wire 10 is inserted into the other end of the tube 34 and the tube crimped into engagement therewith, as shown at 34b. Obviously, other means may be employed, within the scope of the invention, for connecting the wires 8 to the wires 10. After all the connections have been made the copper tubes are suitably positioned with respect to the stylus support 5, the tubes 34 being positioned approximately perpendicular to the surface of the support 5 adjacent the tubes 34.

A plastic body 9, as illustrated in FIGURE 5, is then molded about the copper tubes 34, a short length of the lead-in ware 10 adjacent thereto, the guides 14 adjacent the copper tubes 34 and the wires 8 extending from the stylus support 5 to the copper tubes 34, to complete fabrication of the stylus assembly 4. The plastic body provided by the molding operation is secured to the stylus support 5 by engagement with the top and side walls of the guides 14 and supports the end portions of the wires 8 and 10 adjacent their point of connection, thereby greatly reducing wire breakage which might otherwise occur during shipping and installation of the assembly 4.

The present invention provides a rugged, easily fabricated multiple stylus unit, the method of fabrication of which insures that the lengths of all stylus wires 8 which contact the paper 1 are the same. Also the method of fabrication of the present invention makes it possible to assemble rapidly and with a minimum of complication, a stylus assembly 4 having a large number of closed spaced stylus wires 8.

While we have described and illustrated one specific embodiment of the present invention, it will become apparent that variations of the specific details of construction may be resorted to without departing from the true spirit and scope of the invention as defined in the appended claims.

What we claim is:

1. A stylus assembly comprising an elongated styli support having a plurality of spaced, transverse, peripheral grooves and at least one axially extending groove, a plurality of lengths of stylus wire each having a first portion positioned in one of said peripheral grooves on one side of said axial groove, a second portion disposed perpendicular to said first portion and positioned in said axial groove, a third portion disposed perpendicular to said second portion and positioned in another of said peripheral grooves on the other side of said axial groove, each of said lengths of styli wire being positioned in different peripheral grooves and means securing each of said lengths of styli wire to a surface of said styli support provided by said axial groove.

2. The assembly of claim 1 wherein each of said styli is an electric conductor, and said support is an electric insulator.

3. The combination in accordance with claim 1, wherein there is provided means for securing the end of each of said first portions of styli wire to a different lead-in wire and a molded body secured to said styli support and enclosing said means for securing.

4. The assembly of claim 3 wherein each of said styli is an electric conductor, and said support and molded body are electric insulators.

5. A styli assembly comprising a right cylindrical styli support having a plurality of spaced circumferential grooves and at least one axially extending groove, a plurality of lengths of styli wire each having an arcuate first portion positioned in one of said circumferential grooves on one side of said axial groove, a straight second portion disposed perpendicular to said first portion and positioned in said axial groove, an arcuate third portion disposed perpendicular to said second portion and positioned in another circumferential groove on the other side of said axial groove, the radius of curvature of said first and third portions of each length of styli wire being greater than the radius of curvature of said circumferential grooves and the length of one of said first and third portions of each styli wire being longer than the length of the other, each of said lengths of styli wire being positioned in different grooves and means securing said second lengths of wire to said styli support.

6. The assembly of claim 5 wherein each of said styli is an electric conductor, and said support is an electric insulator.

7. The combination in accordance with claim 5, wherein there is provided means for securing each of the longer portions of said styli wire to a different lead-in wire and a molded body secured to said styli support and enclosing said means for securing.

8. The assembly of claim 7 wherein each of said styli is an electric conductor, and said support and molded body are electric insulators.

9. A styli assembly comprising a support having a plurality of parallel grooves and another groove transverse said plurality of grooves, a plurality of elongated styli, a first portion of each styli located in one of said parallel grooves on one side of said transverse groove, a second portion of each styli located in said transverse groove, a third portion of each styli located in a different one of said parallel grooves than the first portion thereof on the other side of said transverse groove and means for securing each of said styli to said support.

10. The assembly of claim 9 wherein each of said styli is an electric conductor, and said support is an electric insulator.

References Cited in the file of this patent
UNITED STATES PATENTS

| | | |
|---|---|---|
| 2,438,113 | Denmark | Mar. 23, 1948 |
| 2,614,903 | Stamper et al. | Oct. 21, 1952 |
| 2,659,653 | Owens | Nov. 17, 1953 |
| 2,719,775 | Erving | Oct. 4, 1955 |